US011901644B2

(12) United States Patent
Ueda

(10) Patent No.: US 11,901,644 B2
(45) Date of Patent: Feb. 13, 2024

(54) ANTENNA DEVICE, ANTENNA MODULE, AND COMMUNICATION DEVICE

(71) Applicant: Murata Manufacturing Co., Ltd., Kyoto (JP)

(72) Inventor: Hideki Ueda, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 351 days.

(21) Appl. No.: 17/314,454

(22) Filed: May 7, 2021

(65) Prior Publication Data

US 2021/0280970 A1 Sep. 9, 2021

Related U.S. Application Data

(63) Continuation of application No. PCT/JP2019/042311, filed on Oct. 29, 2019.

(30) Foreign Application Priority Data

Nov. 9, 2018 (JP) ................................ 2018-211160

(51) Int. Cl.
*H01Q 3/24* (2006.01)
*H01Q 9/04* (2006.01)
*H01Q 9/32* (2006.01)

(52) U.S. Cl.
CPC ............. *H01Q 3/24* (2013.01); *H01Q 9/0421* (2013.01); *H01Q 9/32* (2013.01)

(58) Field of Classification Search
CPC ........... H01Q 3/24; H01Q 9/0421; H01Q 9/32
See application file for complete search history.

(56) References Cited

U.S. PATENT DOCUMENTS

2006/0152413 A1 7/2006 Uno et al.
2015/0303146 A1* 10/2015 Nakamura ........ H01L 23/49811 257/774

FOREIGN PATENT DOCUMENTS

| | | | | |
|---|---|---|---|---|
| JP | H07-336133 | A | | 12/1995 |
| JP | 2002135046 | A | * | 5/2002 |
| JP | 2004-266367 | A | | 9/2004 |
| JP | 2004-312546 | A | | 11/2004 |
| JP | 2007-324721 | A1 | | 12/2007 |
| JP | 2009124577 | A | * | 6/2009 |
| JP | 2018-019228 | A | | 2/2018 |

OTHER PUBLICATIONS

David M. Pozar, "Microstrip Antennas", Proceedings of IEEE, Jan. 1992, p. 79-91, vol. 80, No. 1, IEEE.

(Continued)

*Primary Examiner* — Dieu Hien T Duong
(74) *Attorney, Agent, or Firm* — Pearne & Gordon LLP

(57) ABSTRACT

A ground plane, at least one composite antenna, and a power feeding line configured to supply power to the at least one composite antenna are provided in or on a substrate. The composite antenna includes a power feeding element configuring a patch antenna together with the ground plane, and at least one linear antenna configured to flow an electric current having a component in a vertical direction with respect to the ground plane. The power feeding line includes a main line connected to the power feeding element, and a branch line branched from the main line and connected to the linear antenna.

20 Claims, 15 Drawing Sheets

(56) References Cited

OTHER PUBLICATIONS

International Search Report for International Patent Application No. PCT/JP2019/042311 dated Jan. 21, 2020.
Written Opinion for International Patent Application No. PCT/JP2019/042311 dated Jan. 21, 2020.
Japanese Office action for 2020-555978 dated Feb. 22, 2022.

* cited by examiner

ANTENNA DEVICE, ANTENNA MODULE, AND COMMUNICATION DEVICE

CROSS REFERENCE TO RELATED APPLICATIONS

This is a continuation of International Application No. PCT/JP2019/042311 filed on Oct. 29, 2019 which claims priority from Japanese Patent Application No. 2018-211160 filed on Nov. 9, 2018. The contents of these applications are incorporated herein by reference in their entireties.

BACKGROUND OF THE DISCLOSURE

Field of the Disclosure

The present invention relates to an antenna device, an antenna module, and a communication device.

Description of the Related Art

As an antenna for radio frequency wireless communication, a microstrip antenna (patch antenna) is used. The following Non Patent Document 1 describes basic characteristics of a patch antenna. The patch antenna includes a patch (power feeding element) made of metal disposed on a dielectric substrate in or on which a ground plane is provided. An antenna gain of the patch antenna is maximized in a normal direction of the ground plane. That is, a main beam of the patch antenna is directed in the normal direction of the ground plane.

Non Patent Document 1: D. M. Pozar, "Microstrip antennas", Proceedings of IEEE, Vol. 80, No. 1, pp. 79-91, January 1992

BRIEF SUMMARY OF THE DISCLOSURE

In some cases, it may be desirable to increase the antenna gain in a direction inclined from the normal direction of the ground plane. In other words, there is a case where the beam is desired to be tilted. However, it is difficult for the patch antenna of the related art to tilt the beam.

An object of the present invention is to provide an antenna device capable of tilting a beam from a normal direction of a ground plane. Another object of the present invention is to provide an antenna module having the antenna device. Still another object of the present invention is to provide a communication device including the antenna module.

According to one aspect of the present invention, there is provided an antenna device including

- a substrate,
- a ground plane provided in or on the substrate,
- at least one composite antenna provided in or on the substrate, and
- a power feeding line configured to supply power to the composite antenna, wherein
- the composite antenna includes
  - a power feeding element configuring a patch antenna together with the ground plane, and
  - at least one linear antenna configured to flow an electric current having a component in a perpendicular direction with respect to the ground plane, and
- the power feeding line includes
  - a main line connected to the power feeding element, and
  - a branch line branched from the main line and connected to the linear antenna.

According to another aspect of the present invention, there is provided an antenna module including

- a substrate,
- a ground plane provided in or on the substrate,
- a composite antenna provided in or on the substrate,
- a power feeding line configured to supply power to the composite antenna, and
- a radio frequency integrated circuit element configured to supply a radio frequency signal to the composite antenna through the power feeding line, wherein
- the composite antenna includes
  - a power feeding element configuring a patch antenna together with the ground plane, and
  - at least one linear antenna configuring an electric current source having a component in a vertical direction with respect to the ground plane, and
- the power feeding line includes
  - a main line connected to the power feeding element, and
  - a branch line branched from the main line and connected to the linear antenna.

According to still another aspect of the present invention, there is provided a communication device including

- the antenna module described above, and
- a baseband integrated circuit element configured to supply an intermediate frequency signal to the radio frequency integrated circuit element of the antenna module.

According to still another aspect of the present invention, there is provided a communication device including

- an antenna device, and
- a housing configured to accommodate the antenna device, wherein
- the antenna device includes
  - a substrate,
  - a ground plane provided in or on the substrate,
  - at least one composite antenna provided in or on the substrate, and
  - a power feeding line configured to supply power to the composite antenna, wherein
- the composite antenna includes
  - a power feeding element configuring a patch antenna together with the ground plane, and
  - at least one vertical portion configured to flow an electric current having a component in a vertical direction with respect to the ground plane,
- the power feeding line includes
  - a main line connected to the power feeding element, and
  - a branch line branched from the main line and connected to the vertical portion, and
- the housing includes
  - a conductor portion connected to the vertical portion, the conductor portion configuring a linear antenna together with the vertical portion.

A radiation electric field from the patch antenna and a radiation electric field from the linear antenna strengthen each other in a partial region of space, and weaken each other in another partial region. An antenna gain increases in the region where the radiation electric field from the patch antenna and the radiation electric field from the linear antenna strengthen each other, whereas the antenna gain decreases in the region where the radiation electric fields weaken each other, and thus, a direction in which a beam of the antenna device is directed can be tilted.

DETAILED DESCRIPTION OF THE DISCLOSURE

First Embodiment

Figure 1A:
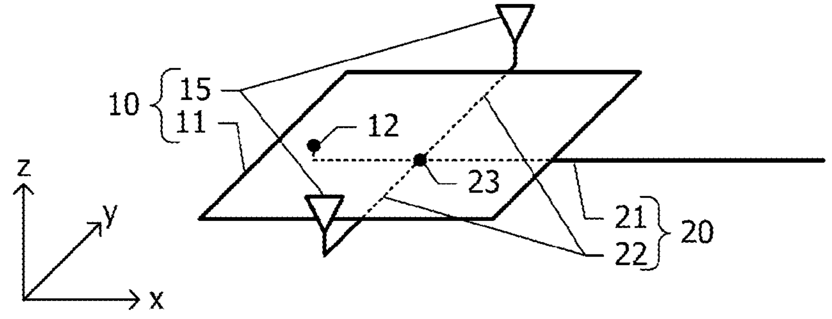
FIG. 1A is a perspective view schematically illustrating an antenna device according to a first embodiment.

An antenna device according to a first embodiment will be described with reference to the drawings from FIG. 1A to FIG. 1C. FIG. 1A is a perspective view schematically illustrating the antenna device according to the first embodiment. The antenna device according to the first embodiment includes a composite antenna 10 provided with a power feeding element 11 formed of a conductor having a plate shape or a film shape, and two linear antennas 15. A planar shape of the power feeding element 11 is a square shape or a rectangular shape. An xyz orthogonal coordinate system is defined in which directions parallel to two edges orthogonal to each other of the power feeding element 11 are respectively defined as an x-axis direction and a y-axis direction.

The two linear antennas 15 are arranged at positions sandwiching the power feeding element 11 in the y-axis direction. A power feeding line 20 includes a main line 21 and a branch line 22. The main line 21 is connected to a power feeding point 12 of the power feeding element 11. Here, "connected" means that conduction is ensured in a direct-current manner or coupling is generated in at least one mode of electric field coupling, magnetic field coupling, and electromagnetic field coupling. The power feeding point 12 is arranged at a position shifted in a negative direction of the x-axis from a geometric center of the power feeding element 11 in a plan view, and the main line 21 extends from the power feeding point 12 in a positive direction of the x-axis. High-frequency power is supplied to the power feeding element 11 through the main line 21.

Two branch lines 22 are branched from a branch point 23 of the main line 21. The branch point 23 is positioned inside the power feeding element 11 in a plan view. The two branch lines 22 are individually connected to the two linear antennas 15, and high-frequency power is supplied to each of the two linear antennas 15 through the corresponding two branch lines 22.

Figure 1B:
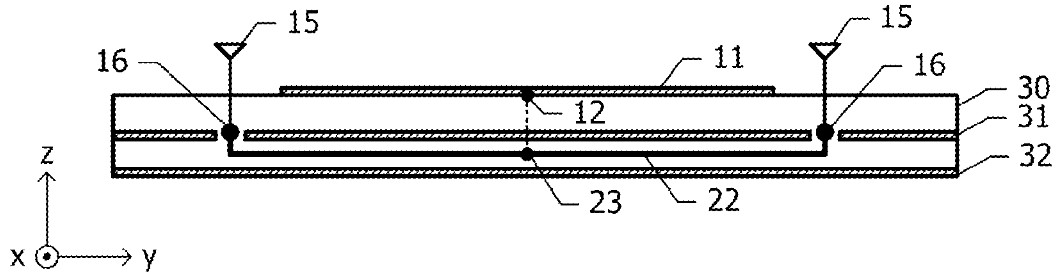
FIG. 1B is a schematic cross-sectional view perpendicular to an x-axis of the antenna device according to the first embodiment.

FIG. 1B is a schematic cross-sectional view perpendicular to the x-axis of the antenna device according to the first embodiment. The power feeding element 11 is disposed on a surface (hereinafter referred to as an upper surface) facing a positive direction of a z-axis of a substrate 30 made of a dielectric, and a ground plane 32 is disposed on a surface (hereinafter referred to as a lower surface) facing a negative direction of the z-axis. Further, a ground plane 31 is also disposed in an inner layer of the substrate 30. The power feeding element 11 and the ground plane 31 configure a patch antenna. An E-plane and an H-plane of radio waves radiated from the patch antenna are parallel to an xz plane and a yz plane, respectively. The main line 21 (FIG. 1A) and the two branch lines 22 are disposed between the ground plane 31 and the ground plane 32.

The linear antenna 15 extends from the ground plane 31 to the upper surface side of the substrate 30. For example, the linear antenna 15 is a monopole antenna, and the ground plane 31 functions as a ground of the monopole antenna. Each of the two branch lines 22 is connected to a power feeding point 16 of the linear antenna 15. The power feeding point 16 is disposed at the same position as that of the ground plane 31 of the inner layer in a thickness direction of the substrate 30. In other words, the power feeding point 16 is positioned in a clearance hole provided in the ground plane 31. A line length from the branch point 23 to the power feeding point 16 of one linear antenna 15 is equal to a line length from the branch point 23 to the power feeding point 16 of the other linear antenna 15.

At a position different from the cross-section illustrated in FIG. 1B in the x-axis direction, the main line 21 (FIG. 1A) passes through the inside of the clearance hole provided in the ground plane 31, and is connected to the power feeding point 12 of the power feeding element 11.

Figure 1C:
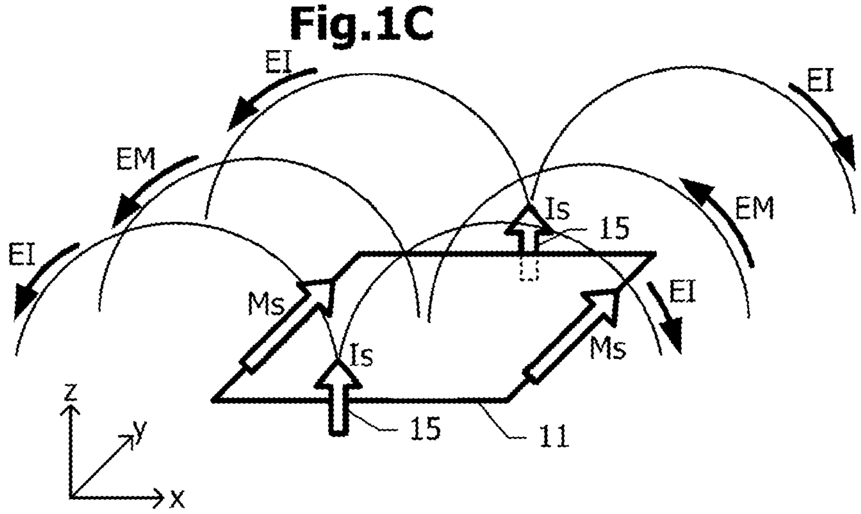
FIG. 1C is a diagram illustrating radiation electric fields by a power feeding element and a linear antenna.

FIG. 1C is a diagram illustrating radiation electric fields by the power feeding element 11 (FIG. 1A) and the linear antennas 15 (FIG. 1A). It can be considered that magnetic currents Ms having the same phase and serving as a wave source are generated between the vicinity of a pair of edges parallel to the y-axis direction of the power feeding element 11 and the ground plane 31. The magnetic current Ms generates a radiation electric field EM. In space on a positive side of the z-axis from the power feeding element 11, directions of x-components of the radiation electric fields EM generated from a pair of magnetic currents Ms are the same as each other. For example, FIG. 1C illustrates a state in which the x-components of the radiation electric fields EM are directed in the negative direction of the x-axis.

The two linear antennas 15 configure electric current sources that allow electric currents Is having the same phase to flow in a direction (a direction parallel to the z-axis) perpendicular to the ground plane 31 (FIG. 1B). This electric current Is serves as a wave source to generate the radiation electric field EI. In the space on the positive side of the z-axis from the ground plane 31, the x-component of the radiation electric field EI on the positive side of the x-axis from the electric current Is serving as the wave source, and the x-component of the radiation electric field EI on the negative side of the x-axis from the electric current Is are opposite to each other. For example, FIG. 1C illustrates a state in which the x-components of the radiation electric fields EI generated in the spaces on the positive side and the negative side of the x-axis from the linear antenna 15 are directed in the positive and negative directions, respectively.

Next, an excellent effect of the first embodiment will be described. In the first embodiment, as described with reference to FIG. 1C, in the space on the positive side of the z-axis from the ground plane 31, the x-components of the radiation electric fields EI are opposite to each other in the space on the positive side of the x-axis and the space on the negative side of the x-axis with a virtual line connecting the two linear antennas 15 being as a boundary therebetween. On the other hand, the x-components of the radiation electric fields EM are directed in the same direction. Thus, with a virtual plane (hereinafter referred to as a "boundary surface") which includes a virtual straight line connecting the two linear antennas 15 and which is parallel to the yz plane being as a boundary, the radiation electric fields EM and EI strengthen each other in one space, and weaken each other in the other space. A direction of a beam of a radiation electric field radiated from the composite antenna 10 is inclined in a direction in which the radiation electric fields EM and EI strengthen each other with respect to the normal direction of the ground plane 31. As described above, in the antenna device according to the first embodiment, it is possible to tilt a beam.

In which space the radiation electric fields EM and EI strengthen each other with the boundary surface being as the boundary depends on a phase relationship between the electric current Is and the magnetic current Ms which serve as the wave sources. The phase relationship between the electric current Is and the magnetic current Ms depends on a difference between the line length of the main line 21 from the branch point 23 (FIG. 1A) to the power feeding point 12 (FIG. 1A) of the power feeding element 11 and the line length of the branch line 22 from the branch point 23 to the power feeding point 16 (FIG. 1B) of the linear antenna 15. Thus, by adjusting the two line lengths, it is possible to adjust a tilt direction and a tilt angle of a beam.

In order to obtain a sufficient effect of strengthening or weakening the radiation electric field EI from the electric current Is and the radiation electric field EM from the magnetic current Ms, it is preferable to bring the magnetic current Ms and the electric current Is that serve as the wave sources sufficiently close to each other. For this reason, in an E-plane direction (x-axis direction), the electric current Is serving as the wave source is preferably disposed between the two magnetic currents Ms serving as the wave sources. In other words, it is preferable to dispose the linear antenna 15 (FIG. 1A) in a range in which the power feeding element 11 (FIG. 1A) is arranged in the E-plane direction. In an H-plane direction (y-axis direction), a distance from the geometric center of the power feeding element 11 to the linear antenna 15 is preferably equal to or smaller than ½ of a wave length in a vacuum at a lower limit of an operating frequency band of the antenna device.

Next, a modified example of the first embodiment will be described. In the first embodiment, the two linear antennas 15 are provided, but only one linear antenna 15 may be provided in some cases. Even in the case where only one linear antenna 15 is provided, an effect of superimposing the radiation electric field EI due to the electric current Is and the radiation electric field EM due to the magnetic current Ms can be obtained. In order to ensure symmetry in the H-plane direction (y-axis direction), it is preferable to arrange the two linear antennas on both sides of the power feeding element 11 in the y-axis direction.

It is preferable that the line length of the branch line 22 from the branch point 23 (FIG. 1A, and FIG. 1B) to the power feeding point 16 (FIG. 1B) of the linear antenna 15 be set to ¼ of a resonant wave length of the linear antenna 15. When this configuration is adopted, an input impedance when the linear antenna 15 is viewed from the branch point 23 becomes high. Therefore, when the branch line 22 (FIG. 1A) is connected to the main line 21 (FIG. 1A), the influence on the input impedance characteristics of the patch antenna including the power feeding element 11 is reduced.

Second Embodiment

Next, an antenna device according to a second embodiment will be described with reference to the drawings from FIG. 2A to FIG. 3B. Hereinafter, the description of a configuration common to the antenna device (FIG. 1A, FIG. 1B, and FIG. 1C) according to the first embodiment will be omitted.

Figure 2A:
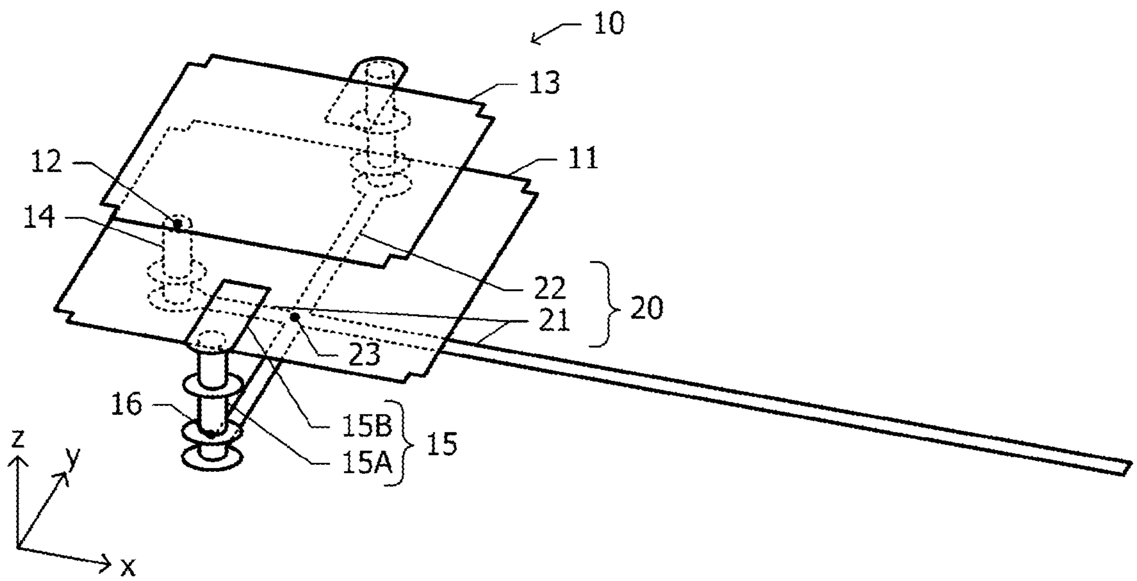
FIG. 2A is a perspective view of a main portion of an antenna device according to a second embodiment.
Figure 2B:
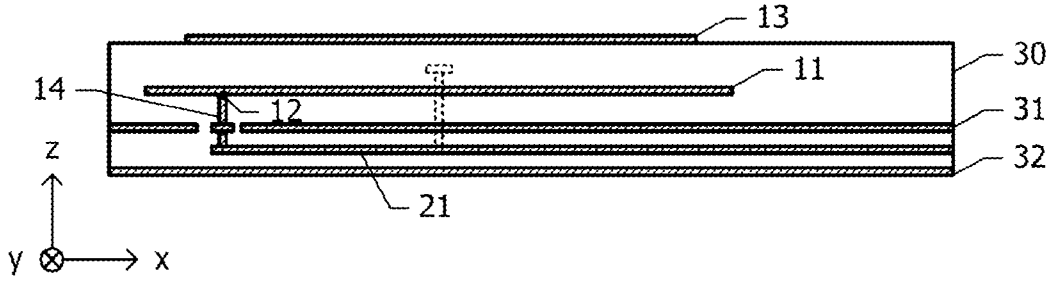
FIG. 2B and FIG. 2C are a cross-sectional view perpendicular to a y-axis of the antenna device according to the second embodiment and a cross-sectional view perpendicular to an x-axis direction of the antenna device according to the second embodiment, respectively.
Figure 2C:
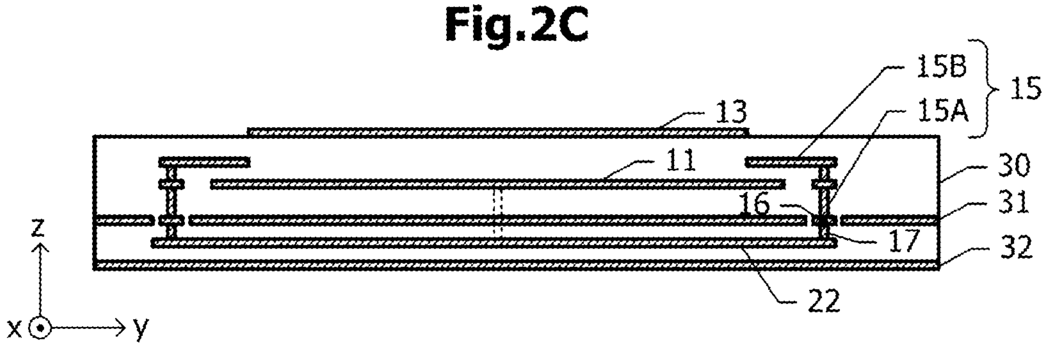

FIG. 2A is a perspective view of a main portion of the antenna device according to the second embodiment. In FIG. 2A, the illustration of a ground plane is omitted. FIG. 2B and FIG. 2C are a cross-sectional view perpendicular to the y-axis and a cross-sectional view perpendicular to the x-axis of the antenna device according to the second embodiment, respectively.

In the second embodiment, the power feeding element 11 is loaded with a parasitic element 13. The parasitic element 13 is disposed at a position farther than the power feeding element 11 when viewed from the ground plane 31 (FIG. 2B). In addition, in the second embodiment, the power feeding element 11 and the parasitic element 13 have a planar shape in which a square shape is cut off from each of the vertices of a square shape or a rectangular shape. Note that the power feeding element 11 and the parasitic element 13 may have a square shape or a rectangular shape.

The main line 21 includes a transmission line disposed between the ground planes 31 and 32 (FIG. 2B), and a via conductor 14 that connects the transmission line to the power feeding point 12 of the power feeding element 11. The via conductor 14 passes through the inside of a clearance hole provided in the ground plane 31. Note that, in the inside of the clearance hole provided in the ground plane 31, a conductor pattern disposed in the same layer as the ground plane 31 is provided.

Each of the linear antennas 15 includes a vertical portion 15A (FIG. 2C) extending in the thickness direction (z-axis direction) of the substrate 30, and a horizontal portion 15B (FIG. 2C) extending in the y-axis direction from an upper end of the vertical portion 15A. The power feeding point 16 is positioned at a lower end of the vertical portion 15A. The branch line 22 includes a transmission line that is disposed between the ground planes 31 and 32, and via conductors 17 that connect the transmission line to the power feeding points 16. The vertical portion 15A and the via conductor 17 are disposed in the clearance hole provided in the ground plane 31 in a plan view. In the clearance hole, a conductor pattern disposed in the same layer as the ground plane 31 is provided.

The horizontal portion 15B is disposed between the power feeding element 11 and the parasitic element 13 in the thickness direction of the substrate 30. The vertical portion 15A is constituted by a via conductor for interlayer connection and a conductor pattern disposed in the same layer as the power feeding element 11.

Next, an excellent effect of the second embodiment will be described. In the second embodiment as well, a beam can be tilted in a similar manner to that in the first embodiment. Further, in the second embodiment, the power feeding element 11 is loaded with the parasitic element 13, and thus, it is possible to widen a bandwidth of the antenna device. Further, since the linear antenna 15 includes the vertical portion 15A and the horizontal portion 15B, it is possible to adjust the resonant frequency of the linear antenna 15 by adjusting a length of the horizontal portion 15B. Further, since the horizontal portions 15B are disposed in a layer different from both the power feeding element 11 and the parasitic element 13, it is possible to set the length of the horizontal portion 15B without being influenced by the arrangement of the power feeding element 11 and the parasitic element 13.

A direction of a high-frequency electric current flowing through the horizontal portion 15B of the linear antenna 15 is parallel to the y-axis. On the other hand, a direction of a high-frequency electric current flowing through the power feeding element 11 and the parasitic element 13 is parallel to the x-axis. Since the direction of the electric current flowing through the power feeding element 11 and the parasitic element 13 and the direction of the electric current flowing through the horizontal portion 15B of the linear antenna 15 are orthogonal to each other, the influence on the patch antenna by arranging the horizontal portions 15B is small. For this reason, when the patch antenna is designed under a condition that the linear antenna 15 is not disposed, and then the linear antenna 15 is designed, it is not necessary to modify the design of the patch antenna. Therefore, it is possible to design the patch antenna and the linear antenna almost independently. As a result, it is possible to obtain an excellent effect that the degree of freedom in design is improved.

Next, a simulation performed in order to confirm that a beam is tilted in the antenna device according to the second embodiment will be described with reference to FIG. 3A and FIG. 3B.

Figure 3A:
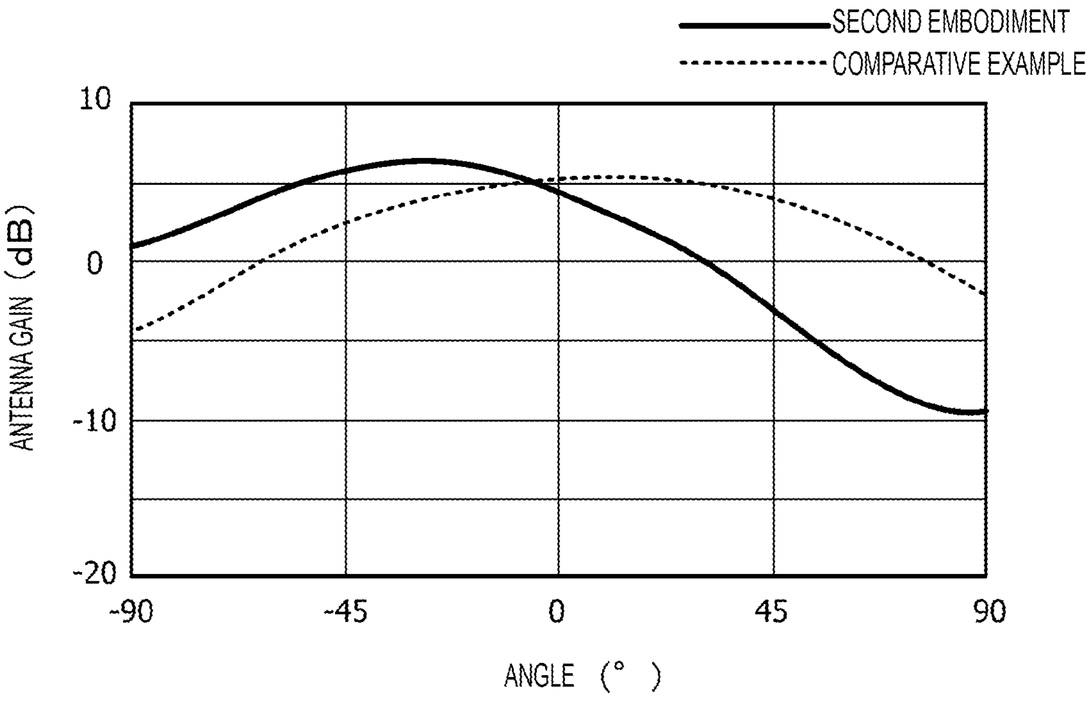
FIG. 3A is a graph illustrating a simulation result related to angle dependency of antenna gains of the antenna device according to the second embodiment and an antenna device according to the comparative example.

FIG. 3A is a graph illustrating a simulation result related to angle dependency of antenna gains of the antenna device according to the second embodiment and an antenna device according to a comparative example. The horizontal axis represents a tilt angle in the x-axis direction from the normal direction (the positive direction of the z-axis) of the ground plane 31 by using the unit "°", and the vertical axis thereof represents an antenna gain by using the unit "dB".

Figure 3B:
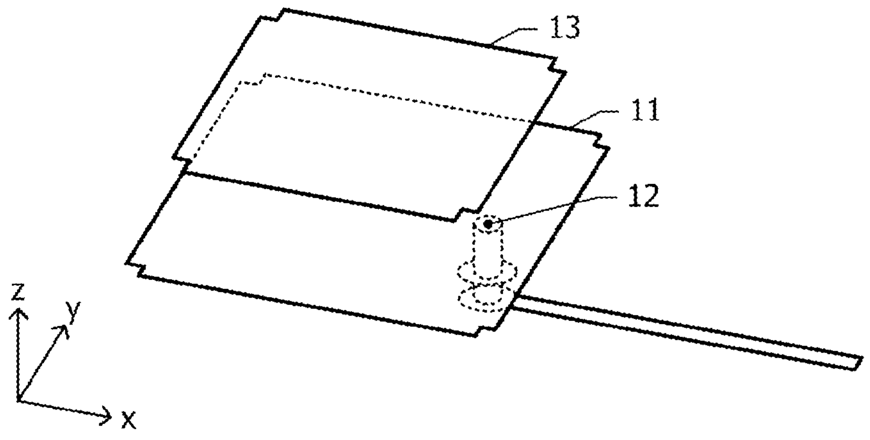
FIG. 3B is a schematic perspective view of an antenna device according to a comparative example.

FIG. 3B is a schematic perspective view of an antenna device according to the comparative example. The antenna device according to the comparative example has the same configuration as a configuration in which the linear antennas 15 and the branch lines 22 are removed from the antenna device (FIG. 2A, FIG. 2B, and FIG. 2C) according to the second embodiment. The antenna device according to the comparative example includes the power feeding element 11 and the parasitic element 13. Note that in the second embodiment, the power feeding point 12 of the power feeding element 11 is positioned on the negative side of the x-axis from the geometric center of the power feeding element 11, but in the comparative example, the power feeding point 12 is positioned on the positive side of the x-axis from the geometric center of the power feeding element 11.

As illustrated in FIG. 3A, in the antenna device according to the comparative example, a beam is not substantially tilted, but in the antenna device according to the second embodiment, the antenna gain has a maximum value in a direction in which an angle is approximately −30°. This means that a beam is tilted at approximately 30° on the negative side of the x-axis. Further, in the antenna device according to the second embodiment, the antenna gain is larger than or equal to 0 dB even in a direction in which the angle is −90°. By the simulation, it has been confirmed that a beam can be tilted by adding the linear antennas 15 to the patch antenna, as in the antenna device according to the second embodiment.

Next, a modified example of the second embodiment will be described. In the second embodiment, the horizontal portion 15B of the linear antenna 15 extends from the vertical portion 15A toward the geometric center of the power feeding element 11. On the contrary, the horizontal portion 15B may extend in a direction away from the geometric center of the power feeding element 11.

Third Embodiment

Next, an antenna device according to a third embodiment will be described with reference to FIG. 4. Hereinafter, the description of a configuration common to that of the antenna device (FIG. 2A, FIG. 2B, and FIG. 2C) according to the second embodiment will be omitted.

Figure 4:
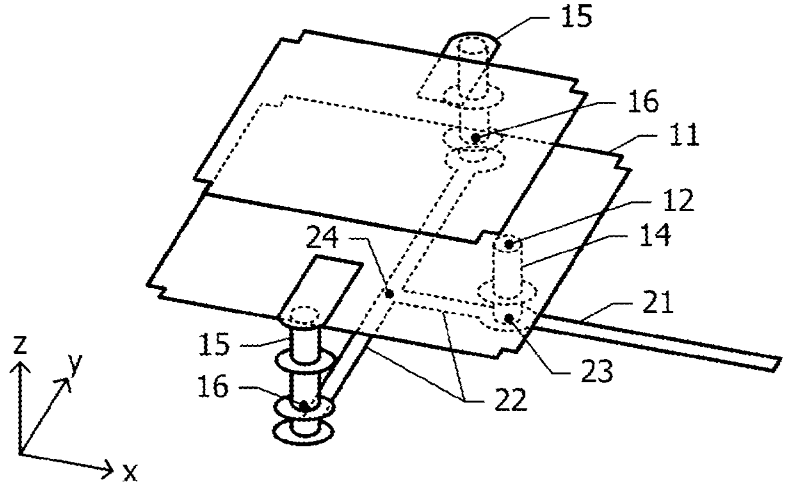
FIG. 4 is a schematic perspective view of a main portion of an antenna device according to a third embodiment.

FIG. 4 is a schematic perspective view of a main portion of an antenna device according to a third embodiment. In the second embodiment, the power feeding point 12 (FIG. 2A) of the power feeding element 11 is positioned on the negative side of the x-axis from the geometric center of the power feeding element 11. On the contrary, in the third embodiment, the power feeding point 12 is positioned on the positive side of the x-axis from the geometric center of the power feeding element 11. In a plan view, the position of the power feeding point 12 and a position of the branch point 23 coincide with each other. The branch point 23 and the power feeding point 12 are connected to each other by the via conductor 14. The main line 21 extends from the branch point 23 toward the positive direction of the x-axis, and one branch line 22 extends toward the negative direction. The one branch line 22 branches to two branch lines 22 at the branch point 24, and each of the two branches is connected to the power feeding point 16 of the linear antenna 15.

Next, an excellent effect of the third embodiment will be described. Also, in the third embodiment, an excellent effect similar to that in the second embodiment can be obtained. Additionally, in the third embodiment, a line length from the branch point 23 to the power feeding point 12 of the power feeding element 11 is substantially equal to a height of the via conductor 14 extending in the thickness direction of the substrate 30 (FIG. 2B), and thus, is shorter than the line length from the branch point 23 to the power feeding point 12 in the second embodiment. The line length of the branch line 22 from the branch point 23 to the power feeding point 16 of the linear antenna 15 is longer than the line length of the branch line 22 (FIG. 2A) in the second embodiment. For this reason, in the third embodiment, a difference between the line length from the branch point 23 to the power feeding point 12 of the power feeding element 11 and the line length from the branch point 23 to the power feeding point 16 of the linear antenna 15 is larger than a difference between the line lengths in the second embodiment. In a case where the difference between the line lengths is desired to be increased, the configuration of the third embodiment is more suitable than that of the second embodiment.

Fourth Embodiment

Next, an antenna device according to a fourth embodiment will be described with reference to FIG. 5. Hereinafter, the description of a configuration common to that of the antenna device (FIG. 2A, FIG. 2B, and FIG. 2C) according to the second embodiment will be omitted.

Figure 5:
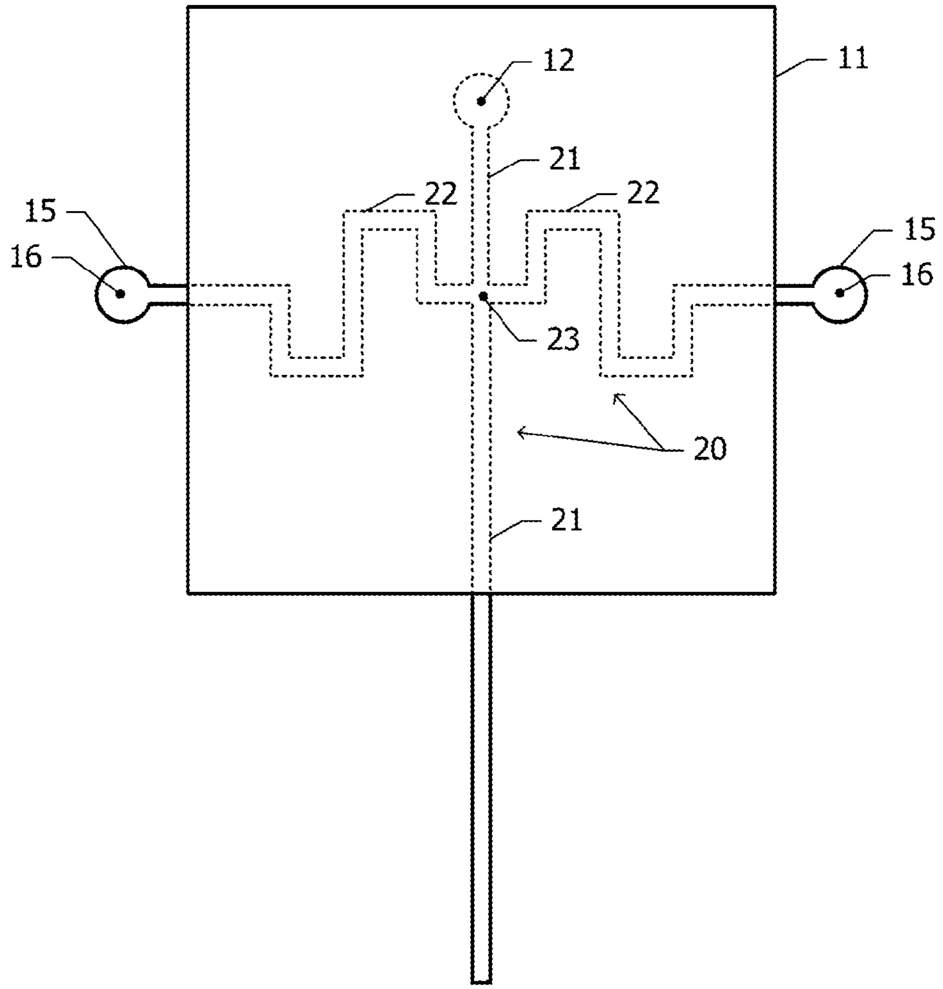
FIG. 5 is a schematic diagram illustrating planar positional relationships and shapes of a power feeding line, a power feeding element, and a linear antenna of an antenna device according to a fourth embodiment.

FIG. 5 is a schematic view illustrating planar positional relationships and shapes of the power feeding line 20, the power feeding element 11, and the linear antenna 15 of the antenna device according to the fourth embodiment. In the second embodiment (FIG. 2A), the branch line 22 from the branch point 23 to the power feeding point 16 of the linear antenna 15 is a straight line, but in the fourth embodiment, the branch line 22 includes a meandering portion. For this reason, the line length of the branch line 22 from the branch point 23 to the power feeding point 16 of the linear antenna 15 is longer than the shortest distance from the branch point 23 to the power feeding point 16 of the linear antenna 15. The main line 21 from the branch point 23 to the power feeding point 12 of the power feeding element 11 is a straight line.

Next, an excellent effect of the fourth embodiment will be described. Also, in the fourth embodiment, an excellent effect similar to that of the second embodiment can be obtained. In addition, in the fourth embodiment, the line length of the branch line 22 from the branch point 23 to the linear antenna 15 is longer than that in the second embodiment. As described in the first embodiment, in order to increase an impedance when the linear antenna 15 is viewed from the branch point 23, it is preferable to set the line length of the branch line 22 from the branch point 23 to the power feeding point 16 to ¼ of the resonant wave length of the linear antenna 15. In a case where a configuration is adopted in which the branch point 23 and the power feeding point 16 are connected to each other by a straight line, when a sufficient line length is not obtained, a part of the branch line 22 may be caused to meander as in the fourth embodiment. This makes it possible to sufficiently lengthen the line length of the branch line 22 from the branch point 23 to the power feeding point 16. As a result, it is possible to obtain an excellent effect that the degree of freedom in design of a power feeding phase difference between the power feeding element 11 and the linear antenna 15 is increased.

Fifth Embodiment

Next, an antenna device according to a fifth embodiment will be described with reference to the drawings from FIG. 6A to FIG. 6C. Hereinafter, the description of a configuration common to that of the antenna device (FIG. 2A, FIG. 2B, and FIG. 2C) according to the second embodiment will be omitted.

Figure 6A:
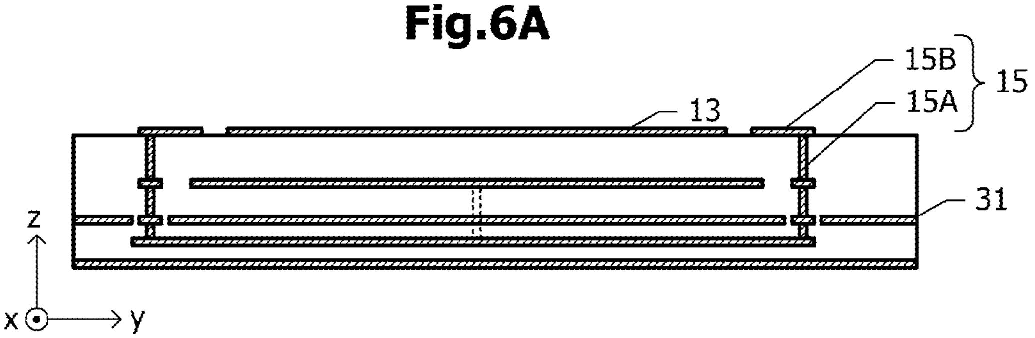
FIG. 6A, FIG. 6B, and FIG. 6C are cross-sectional views of antenna devices according to a fifth embodiment, a modified example of the fifth embodiment, and another modified example of the fifth embodiment, respectively.

FIG. 6A is a cross-sectional view of the antenna device according to the fifth embodiment. In the second embodiment, the horizontal portion 15B (FIG. 2C) of the linear antenna 15 is disposed between the power feeding element 11 and the parasitic element 13 in the thickness direction of the substrate 30. In contrast, in the fifth embodiment, the horizontal portion 15B of the linear antenna 15 is disposed in the same layer as the parasitic element 13. For this reason, the height of the linear antenna 15 when the ground plane 31 is used as a height reference is equal to the height from the ground plane 31 to the parasitic element 13.

Next, an excellent effect of the fifth embodiment will be described. The linear antenna 15 according to the fifth embodiment has a large dimension in the height direction (z-axis direction), compared with the linear antenna 15 according to the second embodiment (FIG. 2C). Components flowing in the height direction of the high-frequency electric current flowing through the linear antenna 15 contribute to the radiation electric field, and components flowing in the horizontal direction hardly contribute to the radiation electric field. In the fifth embodiment, the components that contribute to the radiation electric field among the high-frequency electric current flowing through the linear antenna 15 are larger than those in the second embodiment. For this reason, it is possible to increase an antenna gain of the linear antenna 15.

In the fifth embodiment, since the horizontal portion 15B of the linear antenna 15 is disposed in the same layer as the parasitic element 13, the horizontal portion 15B and the parasitic element 13 cannot be disposed to overlap each other in a plan view. For this reason, the length of the horizontal portion 15B is limited by the positional relationship with the parasitic element 13. When it is necessary to lengthen the horizontal portion 15B to a position overlapping with the parasitic element 13 in relation to a target resonant wave length, the configuration of the second embodiment may be employed.

Figure 6B:
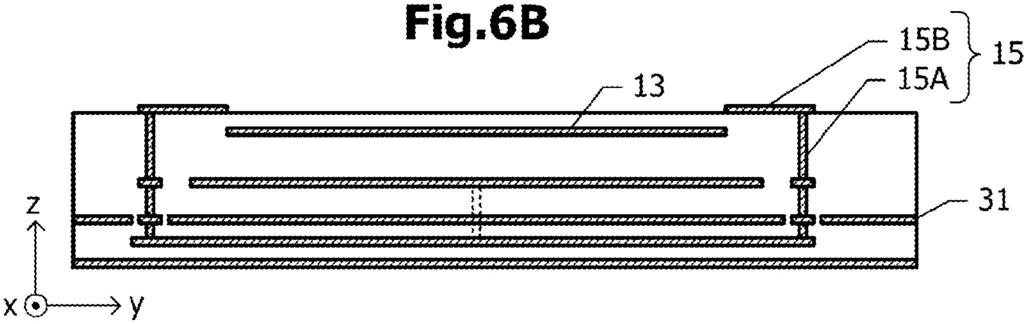

FIG. 6B is a cross-sectional view of an antenna device according to a modified example of the fifth embodiment. In the present modified example, the horizontal portion 15B of the linear antenna 15 is disposed at a higher position than that of the parasitic element 13. In the present modified example, the linear antenna 15 becomes higher than that in the fifth embodiment (FIG. 6A). As a result, the antenna gain of the linear antenna 15 can be further increased. Further, in the present modified example, since the horizontal portion 15B is disposed in a layer different from the parasitic element 13, as in the case of the second embodiment, the horizontal portion 15B and the parasitic element 13 can be arranged so as to overlap each other in a plan view. For this reason, it is possible to cope with the target resonant wave length of the linear antenna 15 more flexibly.

Figure 6C:
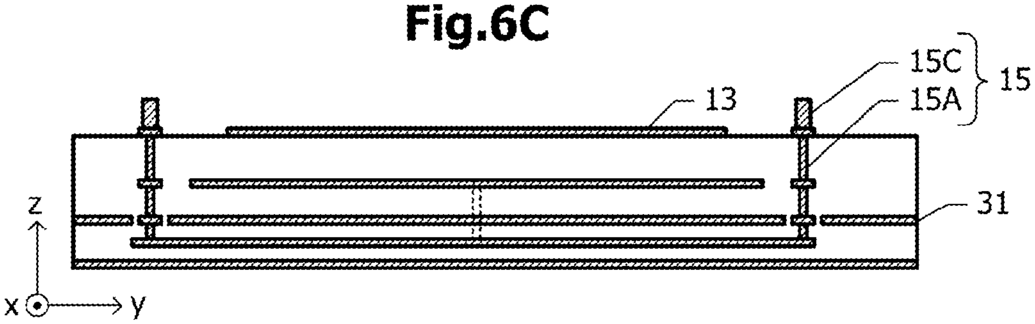

FIG. 6C is a cross-sectional view of an antenna device according to another modified example of the fifth embodiment. In the present modified example, instead of the horizontal portion (FIG. 6A) of the linear antenna 15 of the fifth embodiment, a conductor pillar 15C extending in a vertical direction with respect to the ground plane 31 is used. A conductor pillar 15C is fixed to a land provided on the upper surface of the substrate 30 by using solder, for example. In the present modified example, the components in a height direction of a high-frequency electric current flowing through the linear antenna 15 become larger. As a result, it is possible to further increase the antenna gain of the linear antenna 15.

Sixth Embodiment

Next, an antenna device according to a sixth embodiment will be described with reference to FIG. 7A and FIG. 7B. Hereinafter, the description of a configuration common to that of the antenna device according to the second embodiment (FIG. 2A, FIG. 2B, and FIG. 2C) will be omitted.

Figure 7A:
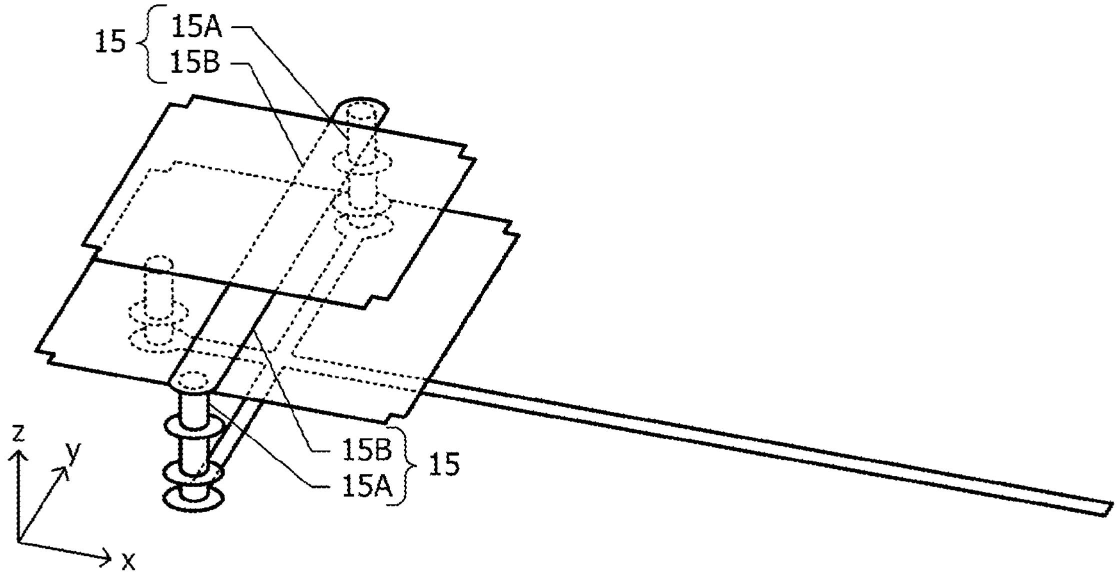
FIG. 7A is a schematic perspective view of a main portion of an antenna device according to a sixth embodiment.
Figure 7B:
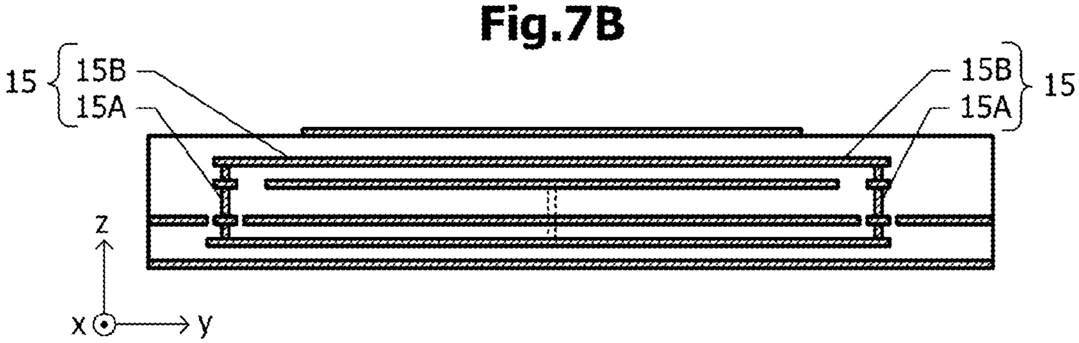
FIG. 7B is a cross-sectional view perpendicular to an x-axis of the antenna device according to the sixth embodiment.

FIG. 7A is a schematic perspective view of a main portion of an antenna device according to a sixth embodiment. FIG. 7B is a cross-sectional view perpendicular to the x-axis of the antenna device according to the sixth embodiment. In the sixth embodiment, the horizontal portion 15B of one of the linear antennas 15 and the horizontal portion 15B of the other of the linear antennas 15 are connected to each other at the tips thereof. That is, the two linear antennas 15 are connected to each other at the tips thereof. As described above, in the sixth embodiment, a loop antenna is constituted by the two linear antennas 15. Since a magnitude of a high-frequency electric current is always 0 at the tip of the horizontal portion 15B of each of the two linear antennas 15, even in a configuration in which both of the tips are connected to each other, a high-frequency electric current similar to that in the case where both of the tips are not connected to each other flows through each of the linear antennas 15.

In the sixth embodiment, an excellent effect similar to that in the second embodiment can be obtained. Further, in the sixth embodiment, the horizontal portion 15B can be made longer than that in the second embodiment. Depending on the target resonant wave length, it may be preferable to adopt the configuration of the sixth embodiment.

Seventh Embodiment

Next, an antenna device according to a seventh embodiment will be described with reference to FIG. 8. Hereinafter, the description of a configuration common to that of the antenna device according to the second embodiment (FIG. 2A, FIG. 2B, and FIG. 2C) will be omitted.

Figure 8:
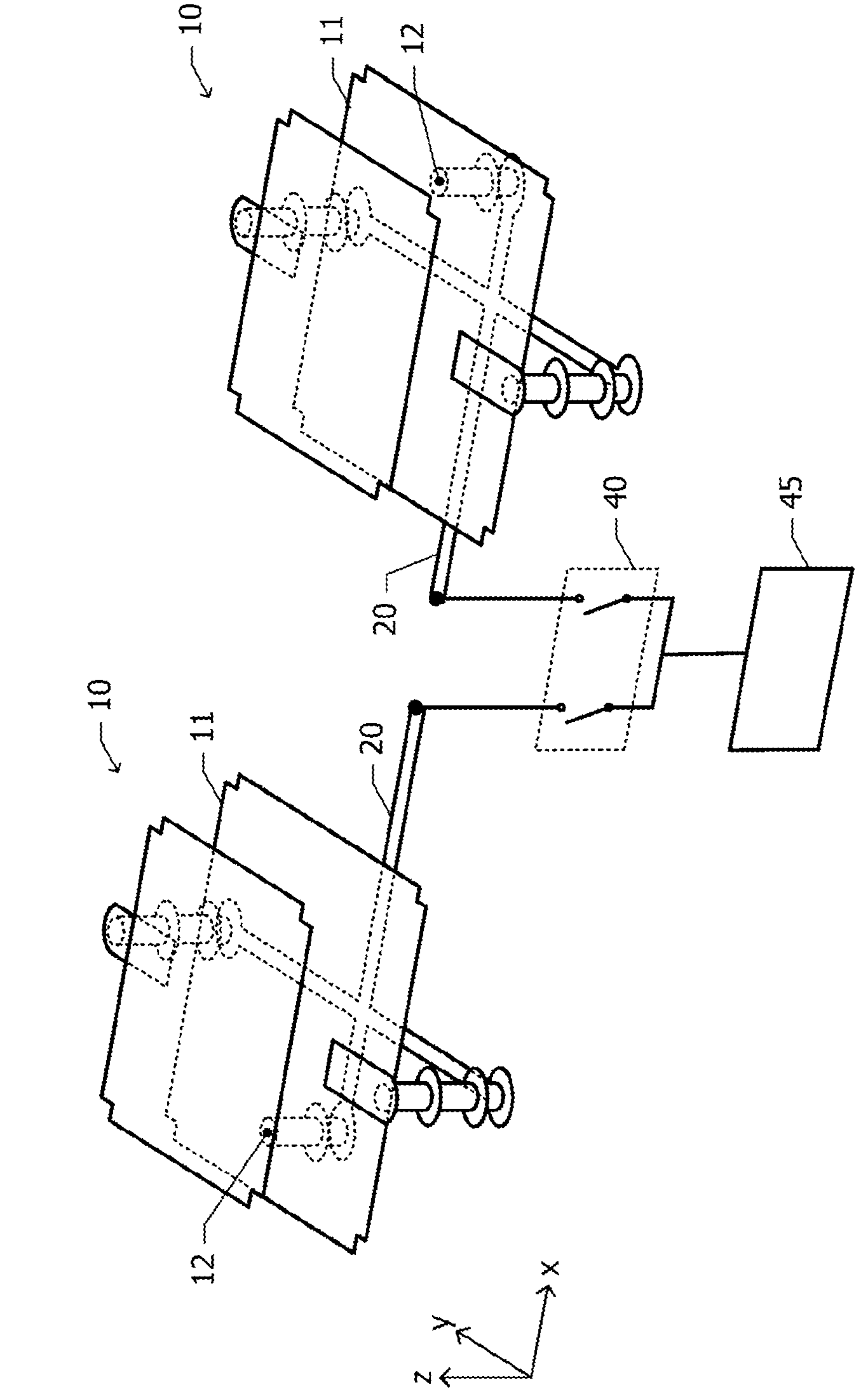
FIG. 8 is a schematic perspective view of a main portion of an antenna device according to a seventh embodiment.

FIG. 8 is a schematic perspective view of a main portion of the antenna device according to the seventh embodiment. The antenna device according to the second embodiment includes one composite antenna 10 (FIG. 2A), but the antenna device according to the seventh embodiment includes two composite antennas 10. A configuration of each of the composite antennas 10 is the same as the configuration of the composite antenna 10 according to the second embodiment. Directions of the two composite antennas are different from each other. That is, directions of vectors when the geometric centers of the power feeding elements 11 of the two composite antennas 10 are defined as start points, and the power feeding points 12 of the power feeding elements 11 are defined as end points differ between the two composite antennas 10. For example, in one of the composite antennas 10, the vector directed from the geometric center of the power feeding element 11 toward the power feeding point 12 is directed in the negative direction of the x-axis, and in the other composite antenna 10, the vector is directed in the positive direction of the x-axis. Thus, a tilt direction of a beam of one of the composite antennas 10 is different from a tilt direction of a beam of the other of the composite antennas 10.

A power feeding line 20 is provided for each of the two composite antennas 10, and power is supplied to the composite antenna 10 through the power feeding line 20. A radio frequency integrated circuit element (RFIC) 45 configured to transmit and receive a radio frequency signal is connected to two power feeding lines 20 with a switch element 40 interposed therebetween. The switch element 40 selects one composite antenna 10 from the two composite antennas 10, and supplies power to the selected composite antenna 10. Further, the switch element 40 can simultaneously supply power to both of the composite antennas 10. It should be noted that a switch element may be provided corresponding to each of the two composite antennas 10, and power may be supplied to the corresponding composite antennas 10 through the two switch elements.

Next, an excellent effect of the seventh embodiment will be described. In the seventh embodiment, a tilt direction of a beam can be switched by switching the composite antenna 10 to be selected by the switch element 40. For example, in the antenna device illustrated in FIG. 3A, one composite antenna 10 can cover a range of a tilt angle in the x-axis direction from 0° to −90°. In the seventh embodiment, by switching the composite antennas 10, the tilt angle in the x-axis direction can cover a range equal to or larger than −90° and equal to or smaller than +90°. Further, by simultaneously selecting the two composite antennas 10, it is possible to increase an antenna gain in the normal direction (the positive direction of the z-axis).

Next, a modified example of the seventh embodiment will be described. In the seventh embodiment, the two composite antennas are provided, but three or more composite antennas 10 may be provided. By making directions of vectors to be directed from the geometric centers of the power feeding elements 11 of the three or more composite antennas 10 toward the power feeding points 12 different from one another in the xy plane, it is possible to change an azimuth direction in which a beam is tilted in the xy plane.

Eighth Embodiment

Figure 9:
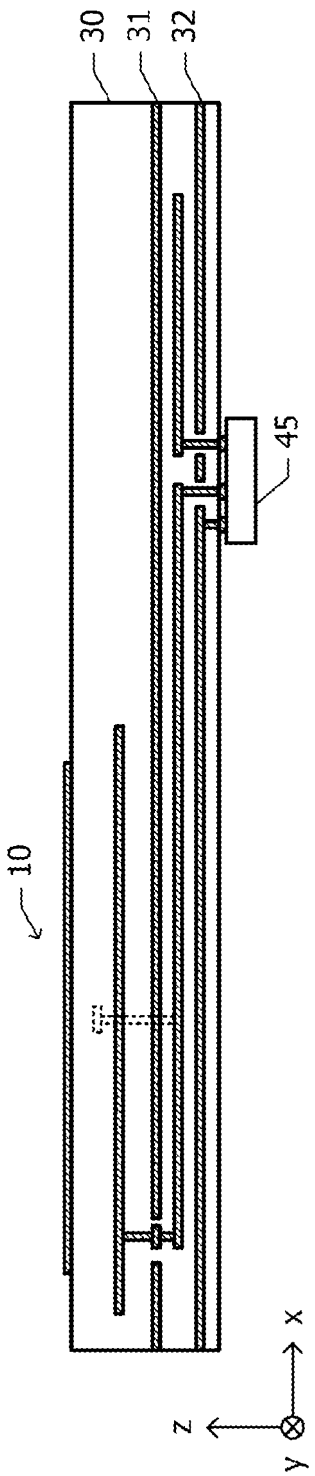
FIG. 9 is a cross-sectional view of an antenna module according to an eighth embodiment.

Next, an antenna module according to an eighth embodiment will be described with reference to FIG. 9. FIG. 9 is a cross-sectional view of the antenna module according to the eighth embodiment. The ground planes 31 and 32 are disposed in the inner layer of the substrate 30. Further, the composite antenna having the same configuration as the composite antenna 10 (FIG. 2A, FIG. 2B, and FIG. 2C) of the antenna device according to the second embodiment is provided in or on the substrate 30. The radio frequency integrated circuit element 45 is mounted on the lower surface of the substrate 30.

The radio frequency integrated circuit element 45 supplies a radio frequency signal including information to be transmitted to the composite antenna 10. Further, when a radio frequency signal received by the composite antenna 10 is inputted to the radio frequency integrated circuit element 45, the radio frequency integrated circuit element 45 down-converts the input radio frequency signal to an intermediate frequency signal.

Next, an excellent effect of the eighth embodiment will be described. In the eighth embodiment, the composite antenna 10 having the same configuration as that of the composite antenna of the antenna device according to the second embodiment is used, and therefore, it is possible to tilt a beam.

Next, a modified example of the eighth embodiment will be described. In the eighth embodiment, the composite antenna 10 having the same configuration as that of the composite antenna of the antenna device according to the second embodiment has been used, but in another case, the composite antenna 10 having the same configuration as that of the composite antenna 10 according to any one of the first embodiment to the seventh embodiment may be used.

Ninth Embodiment

Next, a communication device according to a ninth embodiment will be described with reference to FIG. 10 and FIG. 11. In the ninth embodiment, a phased array antenna is configured of the composite antennas 10 of the antenna device according to any one of the first embodiment to the sixth embodiment.

Figure 10:
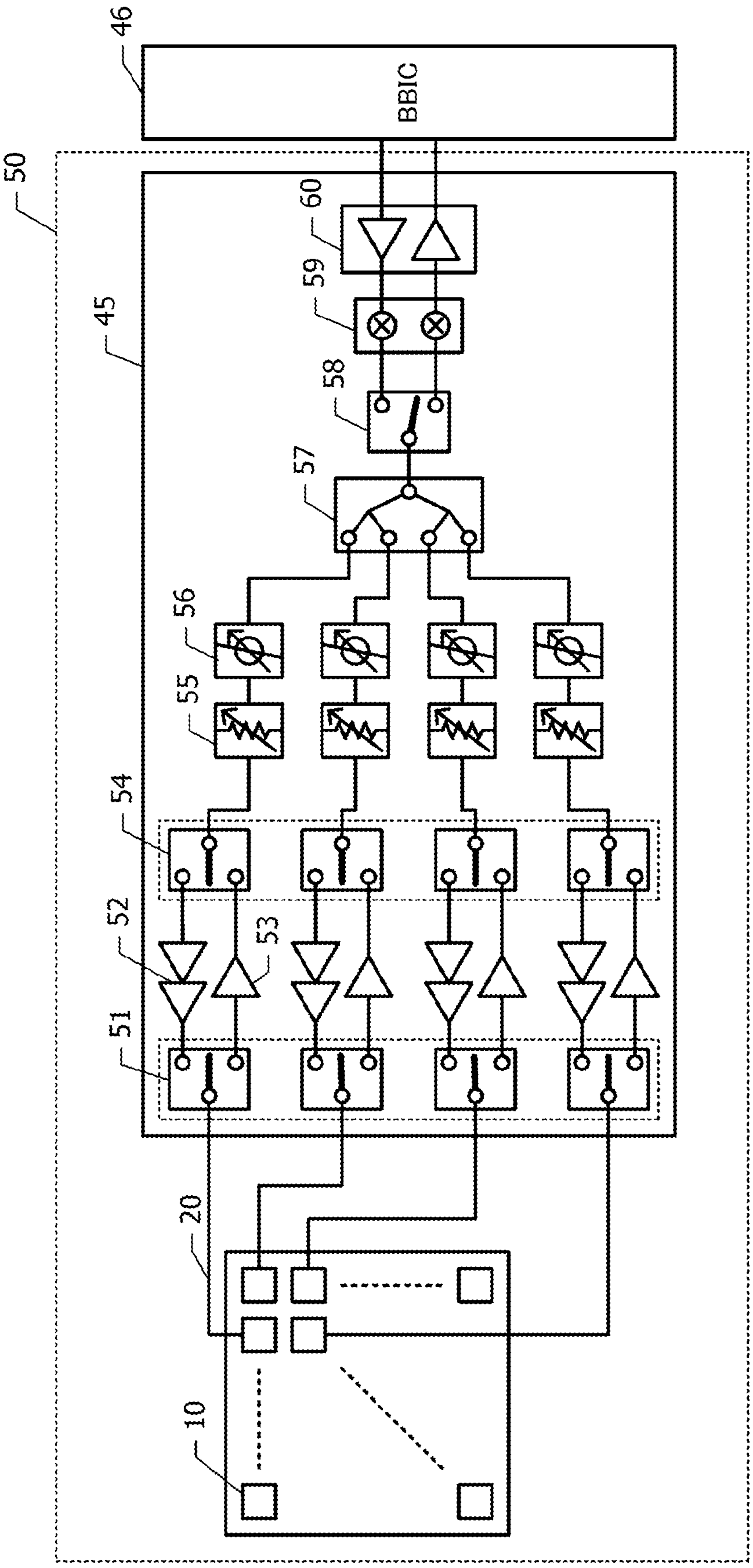
FIG. 10 is a block diagram of a communication device according to a ninth embodiment.
Figure 11:
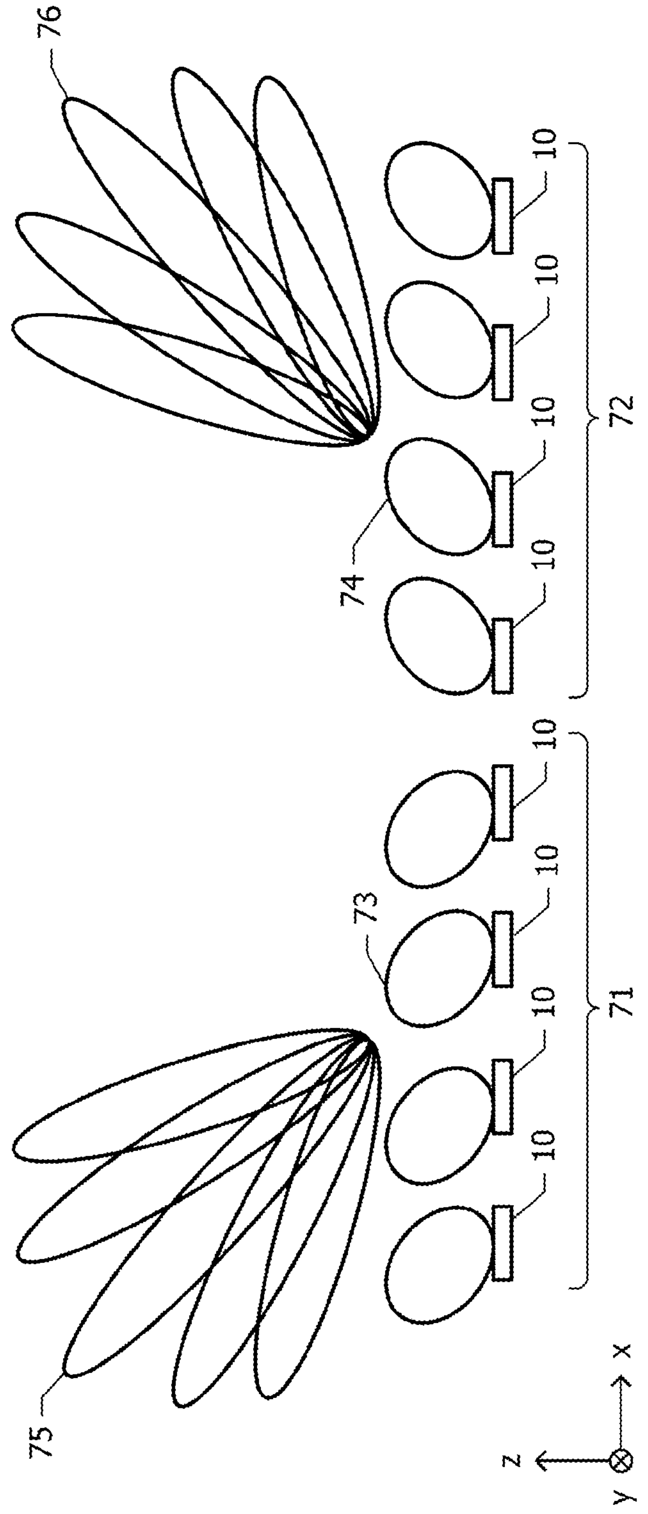
FIG. 11 is a schematic view for explaining an excellent effect of a ninth embodiment.

FIG. 10 is a block diagram of the communication device according to the ninth embodiment. The communication device is installed in, for example, a mobile terminal such as a mobile phone, a smartphone, or a tablet terminal, a personal computer having a communication function, and the like. The communication device according to the ninth embodiment includes an antenna module 50, and a baseband integrated circuit element (BBIC) 46 that performs baseband signal processing.

The antenna module 50 includes an antenna array formed of a plurality of composite antennas 10, and the radio frequency integrated circuit element 45. An intermediate frequency signal including information to be transmitted is inputted from the baseband integrated circuit element 46 to the radio frequency integrated circuit element 45. The radio frequency integrated circuit element 45 up-converts the intermediate frequency signal inputted from the baseband integrated circuit element 46 into a radio frequency signal, and supplies the radio frequency signal to the plurality of composite antennas 10.

Further, the radio frequency integrated circuit element 45 down-converts radio frequency signals received by the plurality of composite antennas 10. The down-converted intermediate frequency signal is inputted from the radio frequency integrated circuit element 45 to the baseband integrated circuit element 46. The baseband integrated circuit element 46 processes the down-converted intermediate frequency signal.

Next, description will be given of a transmission operation of the radio frequency integrated circuit element 45. An intermediate frequency signal is inputted from the baseband integrated circuit element 46 to an up/down conversion mixer 59 with an intermediate frequency amplifier 60 interposed therebetween. The radio frequency signal up-converted by the up/down conversion mixer 59 is inputted to a power divider 57 with a transmission/reception selection switch 58 interposed therebetween. Each of the radio frequency signals divided by the power divider 57 is supplied to the corresponding composite antenna 10 among the plurality of composite antennas 10 via a phase shifter 56, an attenuator 55, a transmission/reception selection switch 54, a power amplifier 52, a transmission/reception selection switch 51, and the power feeding line 20. The phase shifter 56, the attenuator 55, the transmission/reception selection switch 54, the power amplifier 52, the transmission/reception selection switch 51, and the power feeding line 20 which perform the processing of each of the radio frequency signals divided by the power divider 57 are provided for each of the composite antennas 10.

Next, a reception operation of the radio frequency integrated circuit element 45 will be described. A radio frequency signal received by each of the plurality of composite antennas 10 is inputted to the power divider 57 via the power feeding line 20, the transmission/reception selection switch 51, a low-noise amplifier 53, the transmission/reception selection switch 54, the attenuator 55, and the phase shifter 56. The radio frequency signal synthesized by the power divider 57 is inputted to the up/down conversion mixer 59 via the transmission/reception selection switch 58. The intermediate frequency signal down-converted by the up/down conversion mixer 59 is inputted to the baseband integrated circuit element 46 via the intermediate frequency amplifier 60.

The radio frequency integrated circuit element 45 is provided as, for example, a one-chip integrated circuit component including the above-described functions. Alternatively, the phase shifter 56, the attenuator 55, the transmission/reception selection switch 54, the power amplifier 52, the low-noise amplifier 53, and the transmission/reception selection switch 51 corresponding to the composite antenna 10 may be provided as a one-chip integrated circuit for each of the composite antennas 10.

Next, an excellent effect of the ninth embodiment will be described with reference to FIG. 11. FIG. 11 is a schematic view for explaining an excellent effect of the ninth embodiment. The plurality of composite antennas 10 is classified into a plurality of composite antennas 10 belonging to a first group 71 and a plurality of composite antennas 10 belonging to a second group 72. The plurality of composite antennas 10 belonging to the same group has the same directional characteristics, and the composite antennas 10 belonging to different groups have different directional characteristics.

The plurality of composite antennas 10 belonging to the first group 71 is aligned in the x-axis direction, and the plurality of composite antennas 10 belonging to the second group 72 is also aligned in the x-axis direction. An xyz orthogonal coordinate system in which a front direction of the composite antenna 10 is the z-axis direction is defined. A main beam 73 of each of the plurality of composite antennas 10 belonging to the first group 71 is inclined in the negative direction of the x-axis from the front direction. A main beam 74 of each of the plurality of composite antennas 10 belonging to the second group 72 is inclined in the positive direction of the x-axis from the front direction.

When the plurality of composite antennas 10 belonging to the first group 71 is operated as a phased array antenna to perform beam steering, a main beam 75 indicating the maximum gain is inclined in the negative direction of the x-axis with respect to the front direction. Therefore, a coverage area of the phased array antenna formed of the plurality of composite antennas 10 belonging to the first group 71 is biased in the negative direction of the x-axis with the front direction being as a reference. Note that when the plurality of composite antennas 10 belonging to the first group 71 is operated, the composite antennas 10 belonging to the second group 72 are not operated.

On the contrary, when the plurality of composite antennas 10 belonging to the second group 72 is operated as a phased array antenna to perform beam steering, a main beam 76 indicating the maximum gain is inclined in the positive direction of the x-axis with respect to the front direction. Therefore, a coverage area of the phased array antenna formed of the plurality of composite antennas 10 belonging to the second group 72 is biased in the positive direction of the x-axis with the front direction being as a reference. Note that when the plurality of composite antennas 10 belonging to the second group 72 is operated, the composite antennas 10 belonging to the first group 71 are not operated.

Compared to a case of configuring the phased array antenna in which the plurality of antennas is used and whose main beam is directed in the front direction, the coverage area can be further widened by switching the groups of the composite antennas 10 to be operated in the ninth embodiment.

Next, a modified example of the ninth embodiment will be described. In the ninth embodiment, the phased array antenna is configured of the plurality of composite antennas 10 of the first group 71 whose main beam 73 is inclined in the negative direction of the x-axis, and the plurality of composite antennas 10 of the second group 72 whose main beam 74 is inclined in the positive direction of the x-axis. Further, a third group of a plurality of antennas whose main beam is directed in the front direction may be arranged. For example, in the ninth embodiment, when a sufficient antenna gain cannot be obtained when beam steering is performed in the front direction, it is possible to obtain a sufficient antenna gain in the front direction by providing the plurality of antennas belonging to the third group.

Tenth Embodiment

Next, a communication device according to a tenth embodiment will be described with reference to FIG. 12A and FIG. 12B. Hereinafter, the description of a configuration common to the antenna device (FIG. 6A, FIG. 6B, and FIG. 6C) according to the sixth embodiment will be omitted.

Figure 12A:
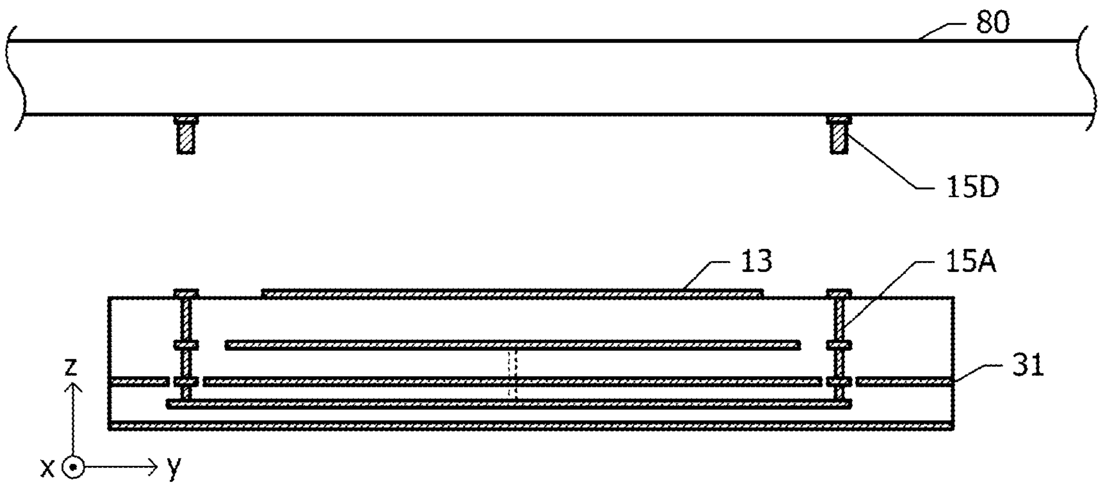
FIG. 12A and FIG. 12B are cross-sectional views respectively illustrating an antenna device of a communication device according to a tenth embodiment before and after the antenna device is fixed to a housing.
Figure 12B:
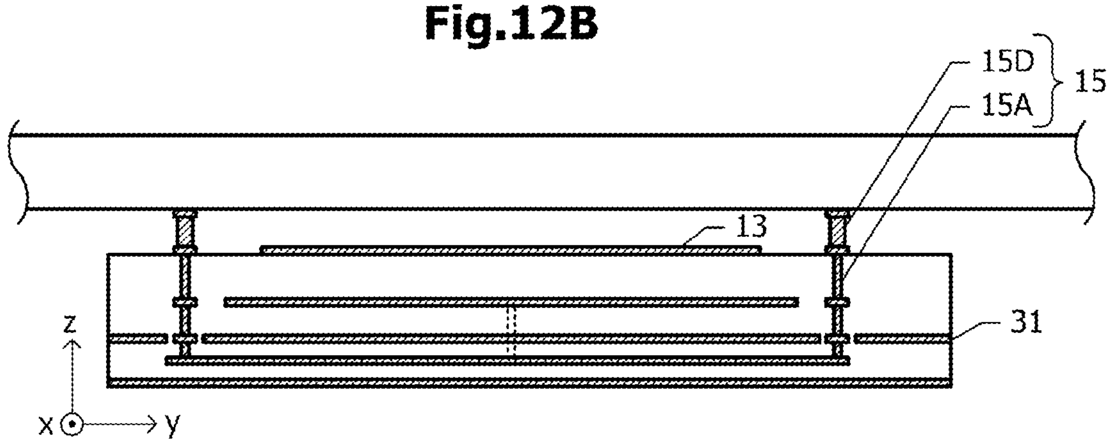

FIG. 12A and FIG. 12B are cross-sectional views respectively illustrating the antenna device of the communication device according to the tenth embodiment before and after the antenna device is fixed to the housing. In the sixth embodiment and the modified example thereof, the horizontal portion 15B or the conductor pillar (conductor portion) 15C connected to the tip of the vertical portion 15A of the linear antenna 15 is provided in or on the substrate 30 of the antenna device. On the other hand, in the tenth embodiment, conductor pillars (conductor portions) 15D are attached to an inner surface of the housing 80 with an adhesive or the like. As the conductor pillars 15D, pogo pins are used. The pogo pin is expandable and contractable in a length direction by a spring or the like, and in a state in which the pogo pin is more contracted than its natural length, a force in an extending direction is generated.

In a state where the antenna device is housed in and fixed to the housing 80, a tip of the conductor pillar 15D on the housing 80 side contacts with a land provided at the tip of the vertical portion 15A on the antenna device side. The vertical portion 15A and the conductor pillar 15D are electrically connected to each other with a land interposed therebetween. Accordingly, the linear antenna 15 is constituted by the vertical portion 15A and the conductor pillar 15D.

Next, an excellent effect of the tenth embodiment will be described. In the tenth embodiment, the conductor pillar 15D attached to the housing 80 operates as the linear antenna 15 together with the vertical portion 15A of the antenna device. Thus, the linear antenna 15 is longer than the vertical portion provided in the antenna device. As a result, it is possible to obtain an excellent effect that a gain of the linear antenna is improved.

Further, in the tenth embodiment, since the pogo pin is used as the conductor pillar 15D, it is possible to flexibly cope with a variation in interval between the antenna device and the housing 80.

Eleventh Embodiment

Next, a communication device according to an eleventh embodiment will be described with reference to FIG. 13A and FIG. 13B. Hereinafter, the description of a configuration common to the antenna device (FIG. 12A and FIG. 12B) according to the tenth embodiment will be omitted.

Figure 13A:
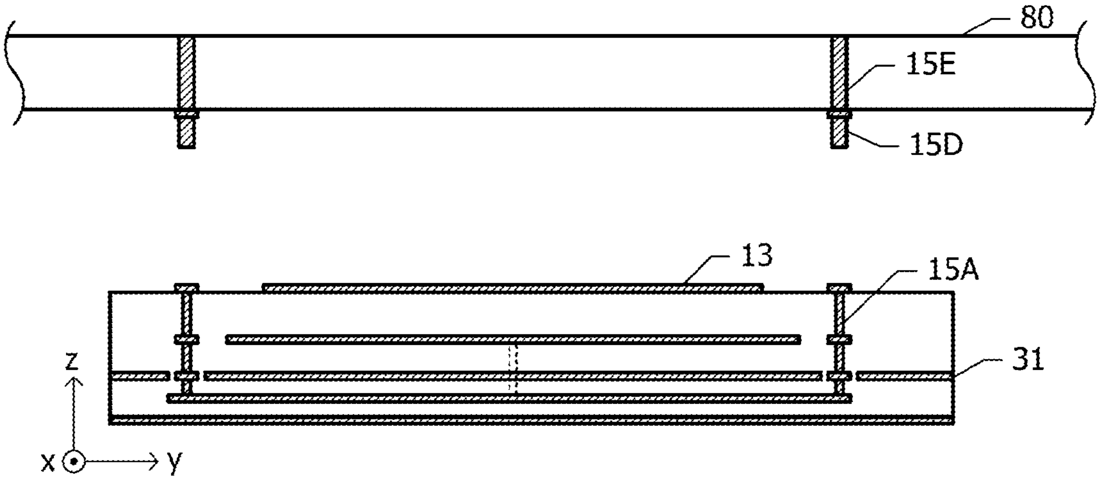
FIG. 13A and FIG. 13B are cross-sectional views respectively illustrating an antenna device of a communication device according to an eleventh embodiment before and after the antenna device is fixed to the housing.
Figure 13B:
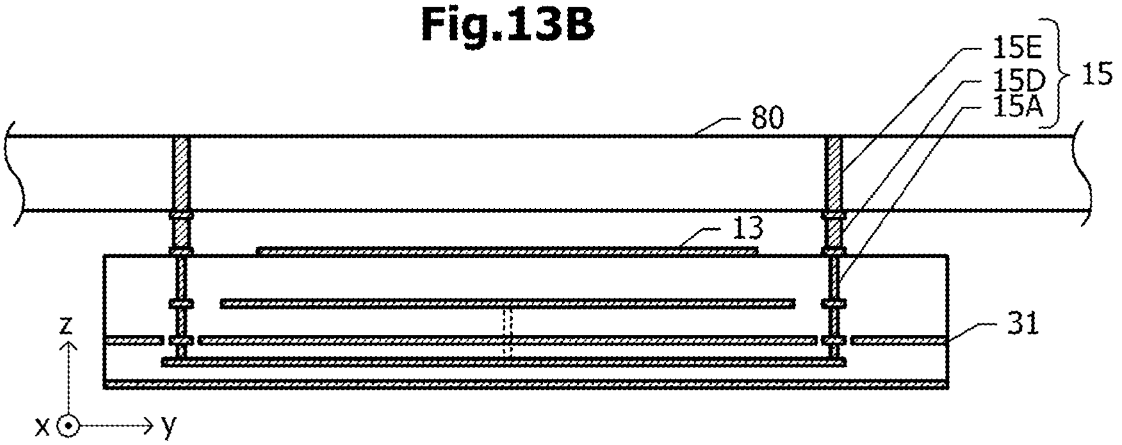

FIG. 13A and FIG. 13B are cross-sectional views respectively illustrating an antenna device of the communication device according to the eleventh embodiment before and after the antenna device is fixed to the housing. In the eleventh embodiment, as in the case of the tenth embodiment, the conductor pillars 15D are attached to the housing 80. In the eleventh embodiment, conductor pillars (conductor portions) 15E are further embedded in the housing 80. The embedded conductor pillar 15E is disposed along an extension line extending in an axial direction of the conductor pillar 15D protruding from the inner surface of the housing 80, and is electrically connected to the conductor pillar 15D. The linear antenna 15 is constituted by the vertical portion 15A, the conductor pillar and the conductor pillar 15E of the antenna device.

Next, an excellent effect of the eleventh embodiment will be described. A substantial length of the linear antenna 15 according to the eleventh embodiment is substantially equal to the sum of the lengths of the vertical portion 15A, the conductor pillar 15D formed of the pogo pin, and the conductor pillar 15E embedded in the housing 80. Since the linear antenna in this embodiment is longer than that in the tenth embodiment, it is possible to obtain an excellent effect that the gain of the linear antenna 15 is further improved.

Next, a communication device according to a modified example of the eleventh embodiment will be described with reference to FIG. 14A and FIG. 14B.

Figure 14A:
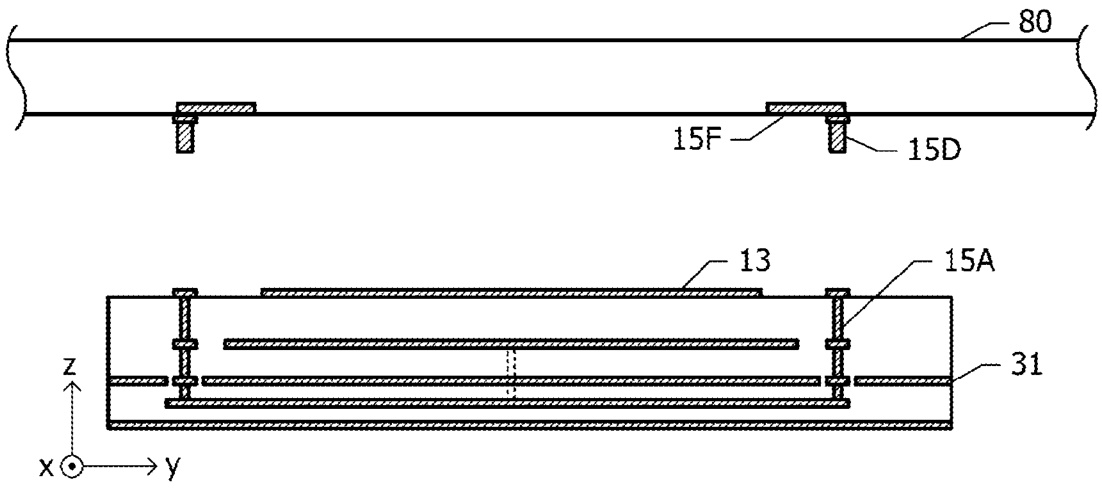
FIG. 14A and FIG. 14B are cross-sectional views respectively illustrating an antenna device of a communication device according to a modified example of the eleventh embodiment before and after the antenna device is fixed to a housing.
Figure 14B:
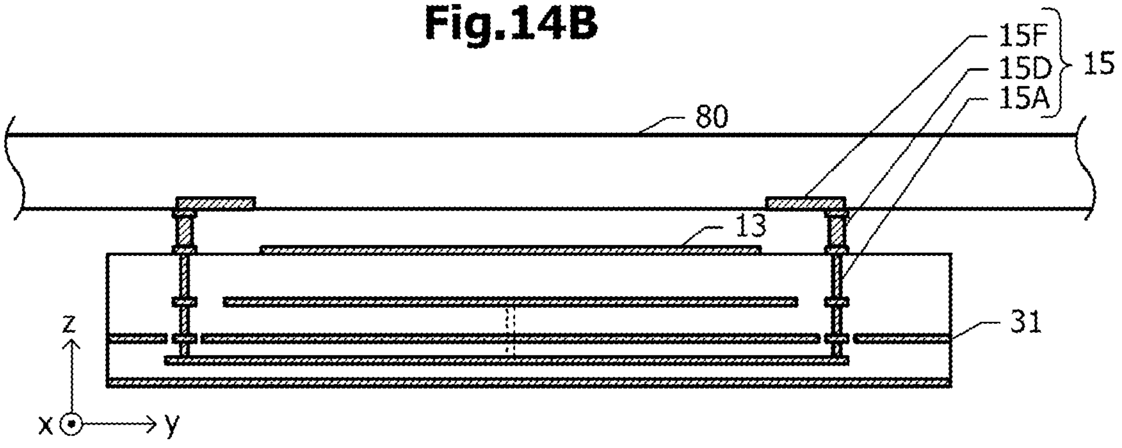

FIG. 14A and FIG. 14B are cross-sectional views respectively illustrating an antenna device of the communication device according to the modified example of the eleventh embodiment before and after the antenna device is fixed to the housing. In the present modified example, instead of the conductor pillars (FIG. 15A and FIG. 15B) embedded in the housing 80 of the communication device according to the eleventh embodiment, conductor members (conductor portions) 15F disposed along the inner surface of the housing 80 are disposed. One end of the conductor member 15F is connected to the conductor pillar 15D. The conductor member 15F extends from a connection point with the conductor pillar 15D toward the parasitic element 13 in a plan view.

In the present modified example, the linear antenna 15 is constituted by the vertical portion 15A, the conductor pillar and the conductor member 15F. Also, in the present modified example, as in the case of the eleventh embodiment, the linear antenna 15 is longer than that in the case of the tenth embodiment, and thus, it is possible to obtain an excellent effect that the gain of the linear antenna 15 is further improved.

Twelfth Embodiment

Next, a communication device according to a twelfth embodiment will be described with reference to FIG. 15A and FIG. 15B. Hereinafter, the description of a configuration common to the antenna device (FIG. 13A and FIG. 13B) according to the eleventh embodiment will be omitted.

Figure 15A:
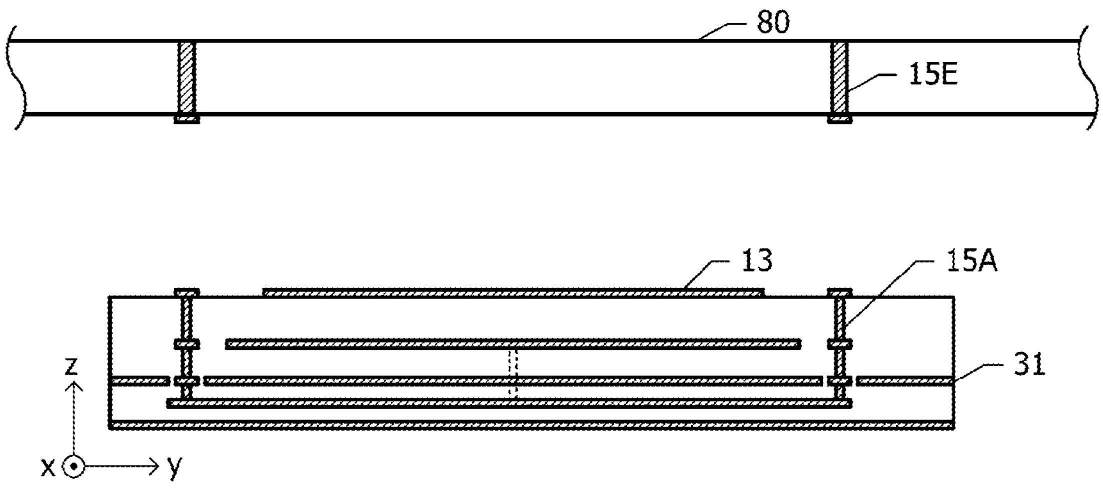
FIG. 15A and FIG. 15B are cross-sectional views respectively illustrating an antenna device of a communication device according to a twelfth embodiment before and after the antenna device is fixed to a housing.
Figure 15B:
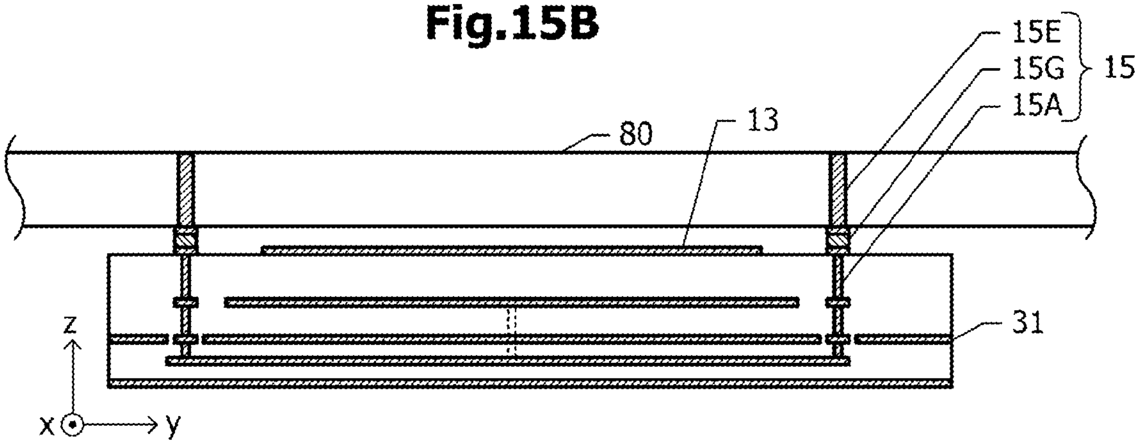

FIG. 15A and FIG. 15B are cross-sectional views respectively illustrating an antenna device of the communication device according to the twelfth embodiment before and after the antenna device is fixed to the housing. In the eleventh embodiment, the vertical portion 15A of the antenna device and the conductor pillar 15E embedded in the housing 80 are connected to each other with the conductor pillar 15D formed of the pogo pin interposed therebetween. In contrast, in the twelfth embodiment, the vertical portion 15A on the antenna device side and the conductor pillar 15E on the housing 80 side are connected to each other by solder 15G. The solder 15G electrically connects the vertical portion 15A and the conductor pillar 15E, and mechanically fixes the antenna device to the housing 80.

Next, an excellent effect of the twelfth embodiment will be described. In the twelfth embodiment, the linear antenna 15 is constituted by the vertical portion 15A, the solder 15G, and the conductor pillar 15E. Since the conductor pillar 15E in the housing 80 operates as a part of the linear antenna 15, the linear antenna 15 in the present embodiment is longer than the linear antenna 15 in the case where the linear antenna 15 is configured only by the vertical portion 15A. As a result, it is possible to obtain an excellent effect that the gain of the linear antenna 15 is improved.

Further, in the twelfth embodiment, since the antenna device is fixed to the housing 80 by the solder 15G, the antenna device can be positioned and fixed with high accuracy with respect to the housing 80 in a reflow process of the solder.

It will be appreciated that the embodiments described above are illustrative only, and that partial substitutions or combinations of the configurations described in different embodiments may be possible. Similar actions and effects according to a similar configuration of the plurality of embodiments will not be successively described for each embodiment. Further, the present invention is not limited to the above-described embodiments. For example, it will be apparent to those skilled in the art that various modifications, improvements, combinations, and the like can be made.

10 COMPOSITE ANTENNA
11 POWER FEEDING ELEMENT
12 POWER FEEDING POINT OF POWER FEEDING ELEMENT
13 PARASITIC ELEMENT
14 VIA CONDUCTOR
15 LINEAR ANTENNA
15A VERTICAL PORTION
15B HORIZONTAL PORTION
15C CONDUCTOR PILLAR
15D CONDUCTOR PILLAR (CONDUCTOR PORTION) ON HOUSING SIDE
15E CONDUCTOR PILLAR (CONDUCTOR PORTION) EMBEDDED IN HOUSING
15F CONDUCTOR MEMBER (CONDUCTOR PORTION)
15G SOLDER
16 POWER FEEDING POINT OF LINEAR ANTENNA
17 VIA CONDUCTOR
20 POWER FEEDING LINE
21 MAIN LINE
22 BRANCH LINE
23, 24 BRANCH POINT
30 SUBSTRATE
31, 32 GROUND PLANE
40 SWITCH ELEMENT
45 RADIO FREQUENCY INTEGRATED CIRCUIT ELEMENT
46 BASEBAND INTEGRATED CIRCUIT ELEMENT
50 ANTENNA MODULE
51 TRANSMISSION/RECEPTION SELECTION SWITCH
52 POWER AMPLIFIER
53 LOW-NOISE AMPLIFIER
54 TRANSMISSION/RECEPTION SELECTION SWITCH
55 ATTENUATOR
56 PHASE SHIFTER
57 POWER DIVIDER
58 TRANSMISSION/RECEPTION SELECTION SWITCH
59 UP/DOWN CONVERSION MIXER
60 INTERMEDIATE FREQUENCY AMPLIFIER
71 FIRST GROUP
72 SECOND GROUP
73, 74, 75, 76 MAIN BEAM
80 HOUSING
EI RADIATION ELECTRIC FIELD BY ELECTRIC CURRENT
EM RADIATION ELECTRIC FIELD BY MAGNETIC CURRENT
Is ELECTRIC CURRENT SERVING AS WAVE SOURCE
Ms MAGNETIC CURRENT SERVING AS WAVE SOURCE

The invention claimed is:

1. An antenna device comprising:
a substrate;
a ground plane provided in or on the substrate;
at least one composite antenna provided in or on the substrate; and
a power feeding line configured to supply power to the composite antenna, wherein:
the composite antenna includes:
a patch antenna comprising a power feeding element and the ground plane, and
at least one linear antenna configured to allow a flow of an electric current having a component in a perpendicular direction with respect to the ground plane, and
the power feeding line includes:
a main line connected to the power feeding element, and
a branch line branched from the main line and connected to the linear antenna.

2. The antenna device according to claim 1, wherein
the linear antenna is disposed in a range in which the power feeding element is disposed in an E-plane direction of a radio wave radiated from the power feeding element.

3. The antenna device according to claim 1, wherein
a line length of the branch line starting from a branch point of the main line to a power feeding point of the linear antenna is ¼ of a resonant wave length of the linear antenna.

4. The antenna device according to claim 3, wherein
a line length of the branch line starting from a branch point of the main line to a power feeding point of the linear antenna is longer than a shortest distance from the branch point to the power feeding point of the linear antenna.

5. The antenna device according to claim 2, wherein
a line length of the branch line starting from a branch point of the main line to a power feeding point of the linear antenna is ¼ of a resonant wave length of the linear antenna.

6. The antenna device according to claim 2, wherein
a line length of the branch line starting from a branch point of the main line to a power feeding point of the linear antenna is longer than a shortest distance from the branch point to the power feeding point of the linear antenna.

7. The antenna device according to claim 2, wherein the branch line includes a meandering portion.

8. The antenna device according to claim 2, wherein the at least one linear antenna includes two linear antennas, and in a plan view, the two linear antennas are disposed on both sides of the power feeding element.

9. The antenna device according to claim 8, wherein a line length of the branch line starting from a branch point of the main line to a power feeding point of the linear antenna is ¼ of a resonant wave length of the linear antenna.

10. The antenna device according to claim 8, wherein a line length of the branch line starting from a branch point of the main line to a power feeding point of the linear antenna is longer than a shortest distance from the branch point to the power feeding point of the linear antenna.

11. The antenna device according to claim 1, wherein a line length of the branch line starting from a branch point of the main line to a power feeding point of the linear antenna is longer than a shortest distance from the branch point to the power feeding point of the linear antenna.

12. The antenna device according to claim 1, wherein the branch line includes a meandering portion.

13. The antenna device according to claim 1, wherein the composite antenna further includes a parasitic element that is disposed at a position farther than the power feeding element in a view from the ground plane and that is loaded to the power feeding element, and a height of the linear antenna when the ground plane is used as a height reference is equal to a height from the ground plane to the parasitic element.

14. The antenna device according to claim 1, wherein at least one composite antenna includes a plurality of composite antennas, and a first direction of a first vector with a first start point a first geometric center of the power feeding element of at least one first composite antenna of the plurality of composite antennas and a first end point a power feeding point of the power feeding element of the at least one first composite antenna is different from a second direction of a second vector with a second start point a second geometric center of the power feeding element of at least one second composite antenna of the plurality of composite antennas and a second end point a power feeding point of the power feeding element of the at least one second composite antenna.

15. An antenna module comprising:

the antenna device according to claim 14; and a switch element configured to:

select at least one composite antenna from the plurality of composite antennas of the antenna device, and supply power to the at least one composite antenna.

16. The antenna module according to claim 15, wherein the switch element is further configured to supply power to all of the plurality of composite antennas.

17. An antenna module comprising:

a substrate;

a ground plane provided in or on the substrate;

a composite antenna provided in or on the substrate;

a power feeding line configured to supply power to the composite antenna; and a radio frequency integrated circuit element configured to supply a radio frequency signal to the composite antenna through the power feeding line, wherein:

the composite antenna includes:

a patch antenna comprising a power feeding element and the ground plane, and an electric current source comprising at least one linear antenna configured to allow a flow of an electric current having a component in a vertical direction with respect to the ground plane, and the power feeding line includes:

a main line connected to the power feeding element, and a branch line branched from the main line and connected to the linear antenna.

18. A communication device comprising:

the antenna module according to claim 17; and a baseband integrated circuit element configured to supply an intermediate frequency signal to a radio frequency integrated circuit element of the antenna module.

19. A communication device comprising:

an antenna device; and a housing configured to accommodate the antenna device, wherein:

the antenna device includes:

a substrate;

a ground plane provided in or on the substrate;

at least one composite antenna provided in or on the substrate; and a power feeding line configured to supply power to the composite antenna, wherein:

the composite antenna includes:

a patch antenna comprising a power feeding element and the ground plane, and at least one vertical portion configured to allow a flow of an electric current having a component in a vertical direction with respect to the ground plane, the power feeding line includes:

a main line connected to the power feeding element, and a branch line branched from the main line and connected to the vertical portion, and the housing includes:

a conductor portion connected to the vertical portion, wherein the conductor portion and the vertical portion operate together as a linear antenna.

20. The communication device according to claim 19, further comprising:

a pogo pin configured to connect the vertical portion and the conductor portion to each other.

* * * * *